US012632967B2

(12) United States Patent
Aasheim et al.

(10) Patent No.: US 12,632,967 B2
(45) Date of Patent: May 19, 2026

(54) SYSTEM AND METHOD FOR FIELD LINE RECONSTRUCTION WITHIN VIDEO OF AMERICAN FOOTBALL

(71) Applicants: Jered Donald Aasheim, Eugene, OR (US); Ethan John Aasheim, Eugene, OR (US)

(72) Inventors: Jered Donald Aasheim, Eugene, OR (US); Ethan John Aasheim, Eugene, OR (US)

(73) Assignee: Jered Donald Aasheim, Eugene, OR (US)

( * ) Notice: Subject to any disclaimer, the term of this patent is extended or adjusted under 35 U.S.C. 154(b) by 279 days.

(21) Appl. No.: 18/369,944

(22) Filed: Sep. 19, 2023

(65) Prior Publication Data

US 2025/0095157 A1 Mar. 20, 2025

(51) Int. Cl.
*G06T 7/13* (2017.01)
*G06V 10/25* (2022.01)
(Continued)

(52) U.S. Cl.
CPC .............. *G06T 7/13* (2017.01); *G06V 10/25* (2022.01); *G06V 10/762* (2022.01); *G06V 20/70* (2022.01);
(Continued)

(58) Field of Classification Search
CPC ............. G06T 7/13; G06T 2207/20081; G06T 2207/20084; G06V 10/25; G06V 20/70; G06V 10/762; G06V 2201/07
See application file for complete search history.

(56) References Cited

U.S. PATENT DOCUMENTS

| | | | | |
|---|---|---|---|---|
| 8,436,902 B2 * | 5/2013 | Kuehnle | ................. | G01W 1/14 |
| | | | | 348/148 |
| 8,750,567 B2 * | 6/2014 | Zhang | ..................... | G06T 7/181 |
| | | | | 348/148 |

(Continued)

FOREIGN PATENT DOCUMENTS

| | | | | | |
|---|---|---|---|---|---|
| CN | 103366156 A | * | 10/2013 | ............. | G06T 7/181 |
| EP | 4085740 A1 | * | 11/2022 | ............. | G06V 10/44 |
| WO | WO-03007487 A2 | * | 1/2003 | ............... | H04B 1/52 |

OTHER PUBLICATIONS

Berjon et al., 2023, "Soccer line mark segmentation and classification with stochastic watershed transform" (pp. 1-12) (Year: 2023).*

(Continued)

*Primary Examiner* — Manav Seth

(57) ABSTRACT

Systems and methods for reconstructing field lines within video may include one or more processor configured by machine-readable instructions. Exemplary implementations may include identifying a plurality of candidate field lines in one or more frame of video; training a neural network to detect one or more field object; detecting, using the neural network, one or more field object in the one or more fame of video; assigning, using the detected one or more field object, a confidence value to each of the plurality of candidate field lines; removing one or more low confidence candidate field line from the plurality of candidate field lines; and retaining one or more high confidence candidate field line from the plurality of candidate field lines.

15 Claims, 11 Drawing Sheets

(51) Int. Cl.
 *G06V 10/762* (2022.01)
 *G06V 20/70* (2022.01)
(52) U.S. Cl.
 CPC .............. *G06T 2207/20081* (2013.01); *G06T 2207/20084* (2013.01); *G06V 2201/07* (2022.01)

(56) References Cited

U.S. PATENT DOCUMENTS

| | | | | |
|---|---|---|---|---|
| 10,133,941 B2 * | 11/2018 | Zheng | ........................ | G06T 7/00 |
| 11,069,049 B2 * | 7/2021 | Sota | .......................... | G06T 7/13 |
| 11,686,941 B2 * | 6/2023 | Mohan | ....................... | G06T 7/13 |
| | | | | 382/199 |
| 11,816,824 B2 * | 11/2023 | Wong | .................. | G06N 3/0464 |
| 12,437,559 B2 * | 10/2025 | Inui | ........................... | G06T 7/13 |
| 2013/0141520 A1 * | 6/2013 | Zhang | ................. | G06V 10/457 |
| | | | | 348/149 |
| 2019/0156489 A1 * | 5/2019 | Onuki | ....................... | G06T 7/13 |
| 2024/0011794 A1 * | 1/2024 | Song | ...................... | G06V 20/70 |
| 2024/0404068 A1 * | 12/2024 | Liu | ........................... | G06T 7/11 |

OTHER PUBLICATIONS

Pontes et al., 2023, "Application of Machine Learning in Soccer Broadcast: a Systematic Review" (pp. 1-19) (Year: 2023).*

Bolt et al., 2023, "Predicting a robot's position on a football field by training a machine learning algorithm on artificially generated data" (pp. 1-37). (Year: 2023).*

Zhou et al., 2022, "Application of Deep Learning Technology in Strength Training of Football Players and Field Line Detection of Football Robots" (pp. 1-21) (Year: 2022).*

Dwijayanto et al., 2019, "Real-Time Object Recognition for Football Field Landmark Detection Based on Deep Neural Networks" (pp . 1-5) (Year: 2019).*

* cited by examiner

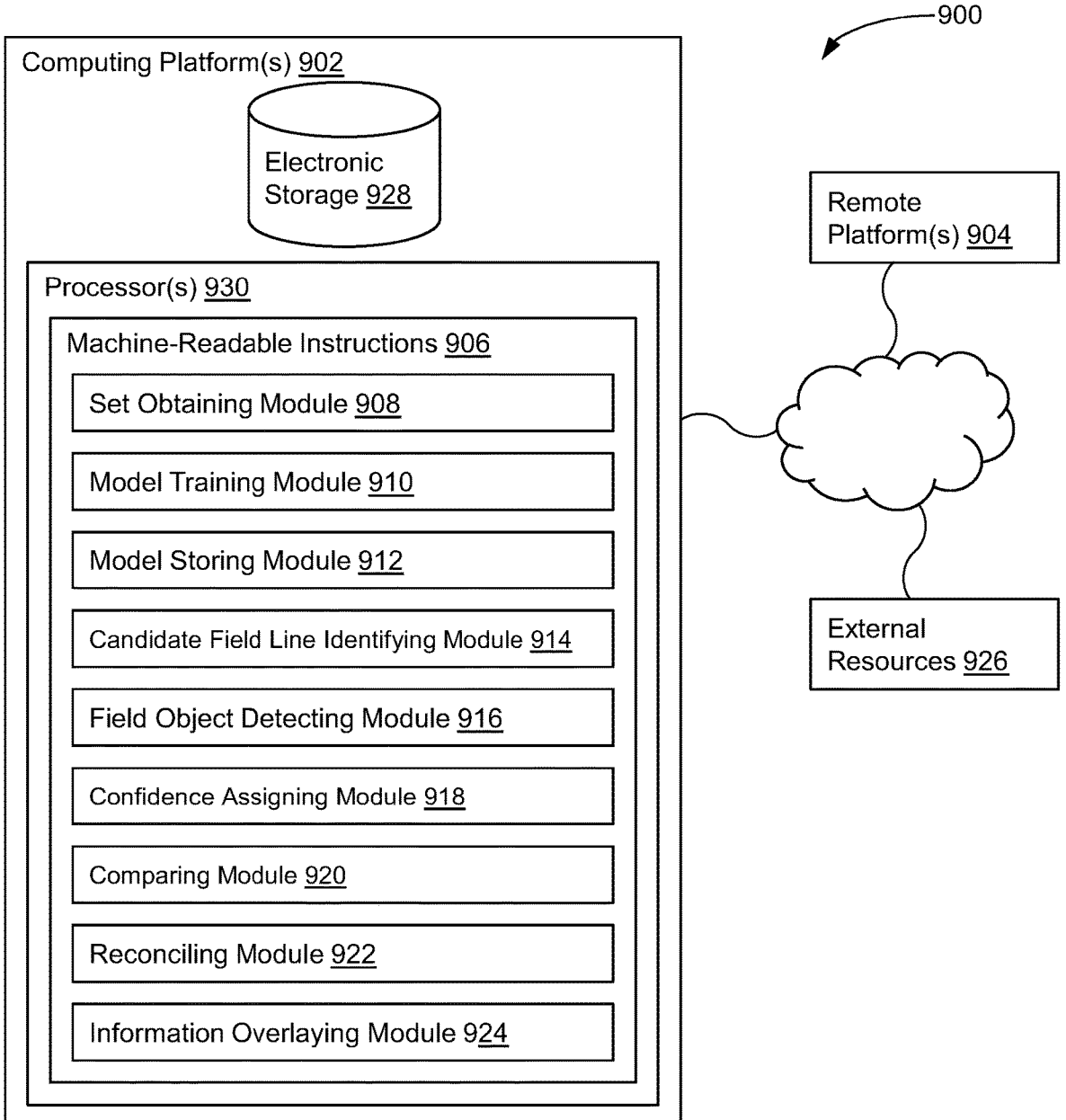

—900

Computing Platform(s) 902

Electronic
Storage 928

Processor(s) 930

Machine-Readable Instructions 906

Set Obtaining Module 908

Model Training Module 910

Model Storing Module 912

Candidate Field Line Identifying Module 914

Field Object Detecting Module 916

Confidence Assigning Module 918

Comparing Module 920

Reconciling Module 922

Information Overlaying Module 924

Remote
Platform(s) 904

External
Resources 926

FIG. 9

SYSTEM AND METHOD FOR FIELD LINE RECONSTRUCTION WITHIN VIDEO OF AMERICAN FOOTBALL

FIELD OF THE INVENTION

This invention relates to video analysis for the sport of American football (as opposed international football which is also commonly referred to within the United States as "soccer"). Particularly, this invention relates to the analysis of video footage of American football to reconstruct the field lines within the field of play. More particularly, the invention relates to a method and system for the use of image processing to identify candidate field lines and then augmenting this analysis using deep learning techniques. Specifically, the invention relates to a novel technique for employing deep learning models to identify existing field objects and then using the predefined geometrical relationships of these field markings to reconstruct an accurate model of the field lines within the field of play. The reconstructed field lines can then be overlayed on to the input video to assist with analysis. This invention is applicable to any type of field of play used in American football whether this be at the high school, college (e.g., NCAA), or professional level of competition (e.g., NFL, CFL, European football, etc.).

BACKGROUND OF THE INVENTION

American football is often described as "a game of inches" because of the importance of the location of the ball during course of the game. Teams strategize and create game plans for how their offenses can best move the ball the length of the field of play into the "end zone" and score points or how to defensively stop their opponent from doing the same. The relatively few numbers of plays in a game (~100 plays is common) results in the margin for error also being relatively low which increases the importance of game planning and preparation.

To create these game plans and strategies, recorded video of opponent play is often analyzed by human experts knowledgeable of the subject matter—specifically coaches—who watch the footage and manually annotate events within the video. Example annotations include position of the line of scrimmage, location of the ball relative to the hashmark, alignments of players, etc. This method of annotating video is time consuming and error prone as many of the observations are subject to human judgment. For example, the determination for how many yards the ball is from the nearest hashmark is subject to the observer's opinion: one person would state it is 1 yard, while another may state 1.5 yards, and yet another person may state 2 yards. There are no accurate guidelines or fine-grain markings in the video to assist the annotator. This subjective human judgment results in undesirable variation in the captured data and the follow-on analytics derived from these assembled datasets.

Another key challenge affecting video annotation is variation within the video itself. Football play is captured with differing levels of video quality, from different vantage points and angles, under a range of lighting conditions, etc. As a result, even when human subjectivity is minimized (i.e., having the same person annotate multiple videos) this variation across video footage can affect the consistency of the annotations.

It is apparent that a need exists for a technique that can eliminate the inconsistency in annotating football video, that is robust to the variation introduced during video capture, and resilient to the error introduced from human subjectivity. The present invention is directed toward providing such a technique.

It is an object of the present invention to provide a method and system for automatically capturing annotations from video of American football. It is also an object of the present invention to deliver robustness against the aforementioned video quality variations which affect the quality of the captured annotations. Another object of the present invention is to eliminate human subjectivity that is typically introduced when capturing these annotations. Still a further object of the present invention is to provide a system for capturing these annotations in a fully automated and scalable manner which does not rely upon human effort, thereby saving labor, time, and ultimately cost. These and other objects of the invention will be apparent to those skilled in the art from the description that follows.

SUMMARY OF THE INVENTION

The method and the system of this invention center around the innovative concept of using deep learning for object detection to augment class image processing techniques to identify existing field lines within the video footage of the field of play. An American football field uses a standard set of field markings for facilitating game play; the key field markings include: solid field lines traversing the width of the field, hashmarks in the middle of the field and along the sidelines along the entire length of the field, and field numbers which mark absolute locations on the field of play. Moreover, it is common for the field to also contain logos and other markings from sponsors, the associated league or conference, etc. These additional markings do not affect the game play but do introduce unique challenges for image processing to identify the field lines within the input video.

The present invention uses these field markings to augment classic image processing techniques to reconstruct a high-confidence, real-time, model of the field lines and hashmarks with the input video. This "field model" is kept in memory and reconstructed every N frames to account for the camera panning and zooming as the football play ensues. In some aspects N=1. In other aspects N is less than 1. This is an important consideration because the video quality varies based upon the camera equipment used, camera operator, lighting conditions, etc. so it is not sufficient to only construct the field model once—it must be repeatedly reconstructed.

To construct the field model, the present invention first uses classic line detection algorithms from the field of image processing to detect a set of candidate field lines. Canny edge detection and the Hough Lines transform are two such popular line detection algorithms. These algorithms require input parameters such as the expected line width, minimum number of consecutive pixels to count, maximum number of gap pixels allowed, etc. to analyze the image and a set of identified line segments. The output line segments are unfortunately not grouped or organized in any predictable manner nor restricted to the actual field lines themselves. Undesirably these algorithms often identify line segments belonging to other markings on the field such as logos, team names, or even groups of players wearing white uniforms. These false positives must be recognized and rejected.

The output set of independent line segments needs to be combined to form the actual field lines and hashmarks, but the aforementioned false positives will introduce unwanted error to the field line construction. Classic image filtering techniques can help reduce the false positivity rate but the unpredictable range of objects in the video footage that can generate unwanted line segments often makes the problem space unbounded, resulting in unrecognized false positives negatively affecting the quality of the reconstructed field lines.

The present invention advances the art by using other standard field markings, namely hashmarks and field numbers, to resolve these issues. To utilize these field markings, the system must detect these objects in real-time within the video. To enable this capability, the system employs deep learning to train a neural network which can detect the hashmarks and field numbers on the field of play. Thousands of images of football fields from different camera angles, lighting conditions, perspectives, etc. were obtained and the hashmark and field number marking locations were annotated by human experts. These annotations were then used to train a neural network and produce a generalized model which can then identify these same type of field objects in unseen video footage that is processed by the system.

With the ability to detect these known field objects in the video frame, the geometrical relationships of these objects relative to the locations of the expected field lines are utilized to assign confidences to each of the candidate field lines. For example, in a standard American football field there are solid lines traversing the width of the field that intercept the hashmarks in the middle of the field with a very discernible crossbar line segment at the point of interception. Moreover, every field line intercepts four hashmark locations-two in the middle of the field and one on each of the two sidelines. Further still, there are always eighteen distinct field number markings traversing the length field and every other field line bisects a pair of field numbers. Using the predefined dimensions of an American football field, the system uses the detected field objects to assign confidence scores to each the candidate field lines. This method results in a robust way of rejecting false positives and producing a high-quality, real-time, reconstruction of the original field lines within the input video.

In one aspect of the disclosure, a system for reconstructing field lines within video may include one or more processor configured by machine-readable instructions. The system may be configured for identifying a plurality of candidate field lines in one or more frame of video. The system may be configured for training a neural network to detect one or more field object. The system may be configured for detecting, using the neural network, one or more field object in the one or more fame of video. The system may be configured for assigning, using the detected one or more field object, a confidence value to each of the plurality of candidate field lines. The system may be configured for removing one or more low confidence candidate field line from the plurality of candidate field lines and retaining one or more high confidence candidate field line from the plurality of candidate field lines.

In some aspects of the disclosure, identifying a plurality of candidate field lines may include applying a clustering algorithm to group similar line segments into a cluster, and iterating through the clusters to identify a single candidate field line for each cluster.

In some aspects of the disclosure, the one or more field object may include one or more hashmark and field number.

In some aspects of the disclosure, the system may be configured for recalibrating the alignment of the one or more high confidence candidate field line to intercept the middle of the detected one or more field object.

In some aspects of the disclosure, the system may be configured for constructing one or more orthogonal hashmark field line and sideline.

In some aspects of the disclosure, the system may be configured for assigning the one or more high confidence candidate field line a value of an intercepted field number.

In some aspects of the disclosure, the system may be configured for identifying and replacing one or more missing field line.

In some aspects of the disclosure, the system may be configured for overlaying the one or more high confidence candidate field line on the one or more frame of video.

In some aspects of the disclosure, the identifying a plurality of candidate field lines may utilize a Canny edge or Hough line algorithm.

In some aspects of the disclosure, the system may be configured for creating a field model including the one or more high confidence candidate field line, one or more hashmark, and one or more sideline.

In some aspects of the disclosure, the clustering algorithm may group line segments having similar axis intercepts.

In some aspects of the disclosure, training a neural network may include annotating field markings or field objects on samples of video.

In some aspects of the disclosure, the system may be configured for overlaying the one or more high confidence candidate field line along with bounding boxes surrounding the detected one or more field object.

In some aspects of the disclosure, assigning a confidence value may include determining whether each of the plurality of candidate field lines intercepts one or more hashmark.

In some aspects of the disclosure, assigning a confidence value may include determining whether each of the plurality of candidate field lines intercepts a field number.

In another aspect of the disclosure, a method for reconstructing field lines within video may include obtaining sets of football video information, wherein individual ones of the sets of football video information reflect gameplay. The method may include training a machine-learning model with the obtained sets of football video information such that the machine-learning model predicts the locations of one or more hashmark and field number. The method may include storing the trained machine-learning model.

In some aspects, the method may include overlaying one or more bounding box for one or more hashmark and field number.

In some aspects, the method may include assigning a confidence value to each of a plurality of candidate field lines, wherein a hashmark intercept or a field number intercept increases the confidence value.

In some aspects, the method may include reconciling the alignment of one or more candidate field line having a high confidence value to intercept one or more hashmark or field number.

In some aspects, the method may include assigning each of the plurality of candidate field lines a value associated with an intercepted field number.

In some aspects, the method may include identifying and replacing missing field lines.

In some aspects, the method may include assigning location names to the candidate field lines based upon intercepting identified field numbers and the geometrical definitions of the field of play.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIG. 9 illustrates a system configured for reconstructing field lines within video, in accordance with one or more implementations.

DETAILED DESCRIPTION OF THE INVENTION

Figure 1:
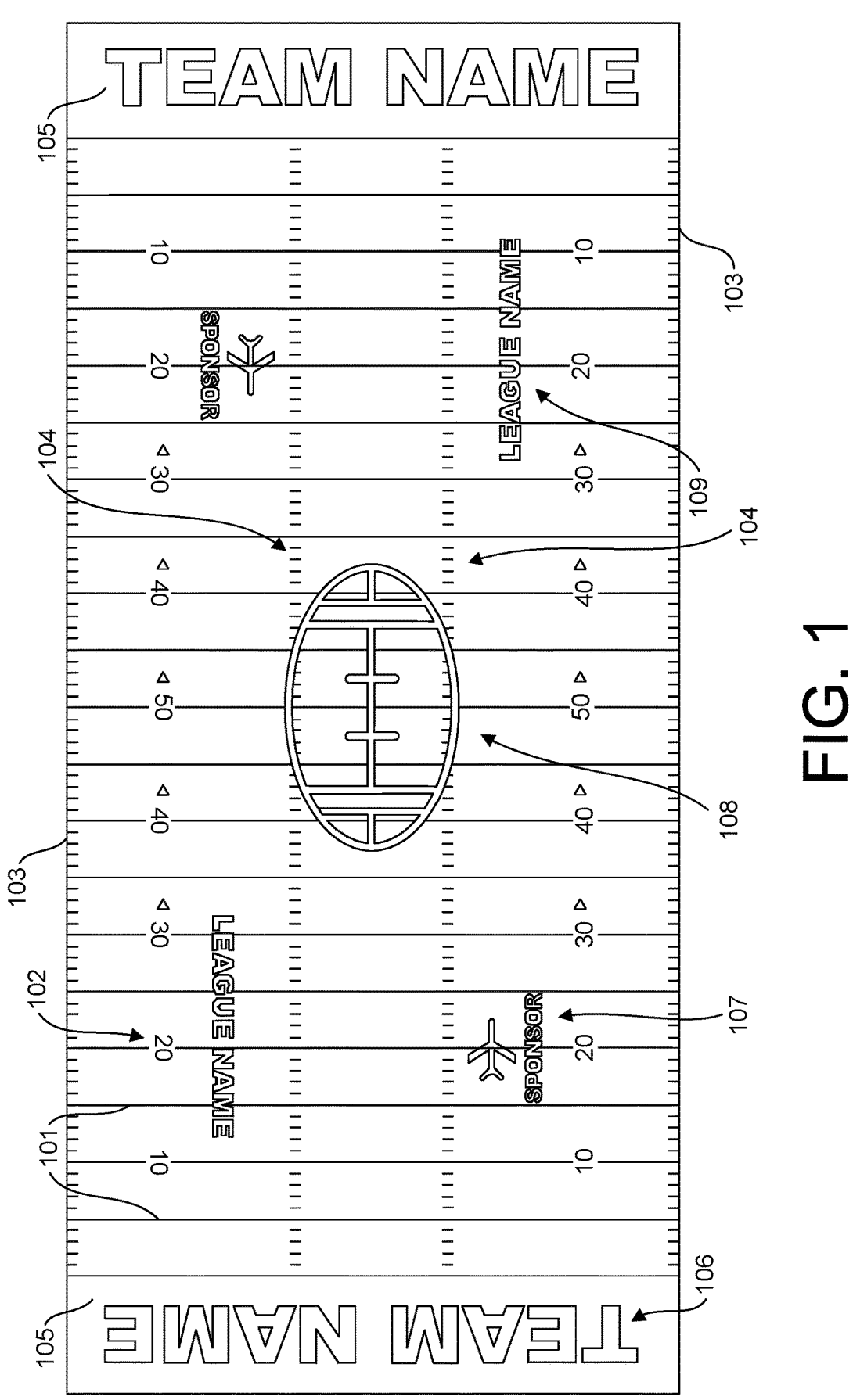
FIG. 1 is a top-view diagram illustrating a conventional American football field with the standard conventional field markings as well as example optional markings on the field of play.

The method and the system of this invention center around the innovative concept of augmenting classic image processing techniques with deep learning object detection to identify existing field markings in the video footage and then using the predefined geometrical relationships of these field markings to reconstruct an accurate model of the field lines within the field of play. Referring to FIG. 1, an American football field uses a standard set of field markings for facilitating game play. The key markings on the field of play include solid field lines 101 traversing the width of the field, hashmarks 104 in the middle of the field as well as along the sidelines 103 traversing the entire length of the field, and field numbers 102 which mark absolute locations on the field of play. Further, an end zone 105 is located on both ends of the field which is used for scoring points. Moreover, it is common for the field to also contain logos 108, markings from sponsors 107, team names 106 in the end zones, and text or logos naming the associated league or conference 109, etc. These additional markings do not affect the game play but do introduce unique challenges when using computer vision to analyze the video footage.

The present invention uses these three different types of field markings to reconstruct a real-time model of the field lines 101, hashmarks 104, and sidelines 103 for the given scene in the video. This "field model" is kept in memory and reconstructed every N frames to account for the camera panning and zooming as the football play ensues. In some aspects, N=1. In some aspects, N is less than 1. This is an important consideration because the video quality varies based upon the camera equipment used, camera operator, lighting conditions, etc. so it is not sufficient to only construct the field model once—it must be repeatedly reconstructed. In some aspects, the field model may be reconstructed ever frame or less. For example, the field model may be reconstructed up to 60 times in every second of video depending upon the frame rate of the underlying video.

Figure 2:
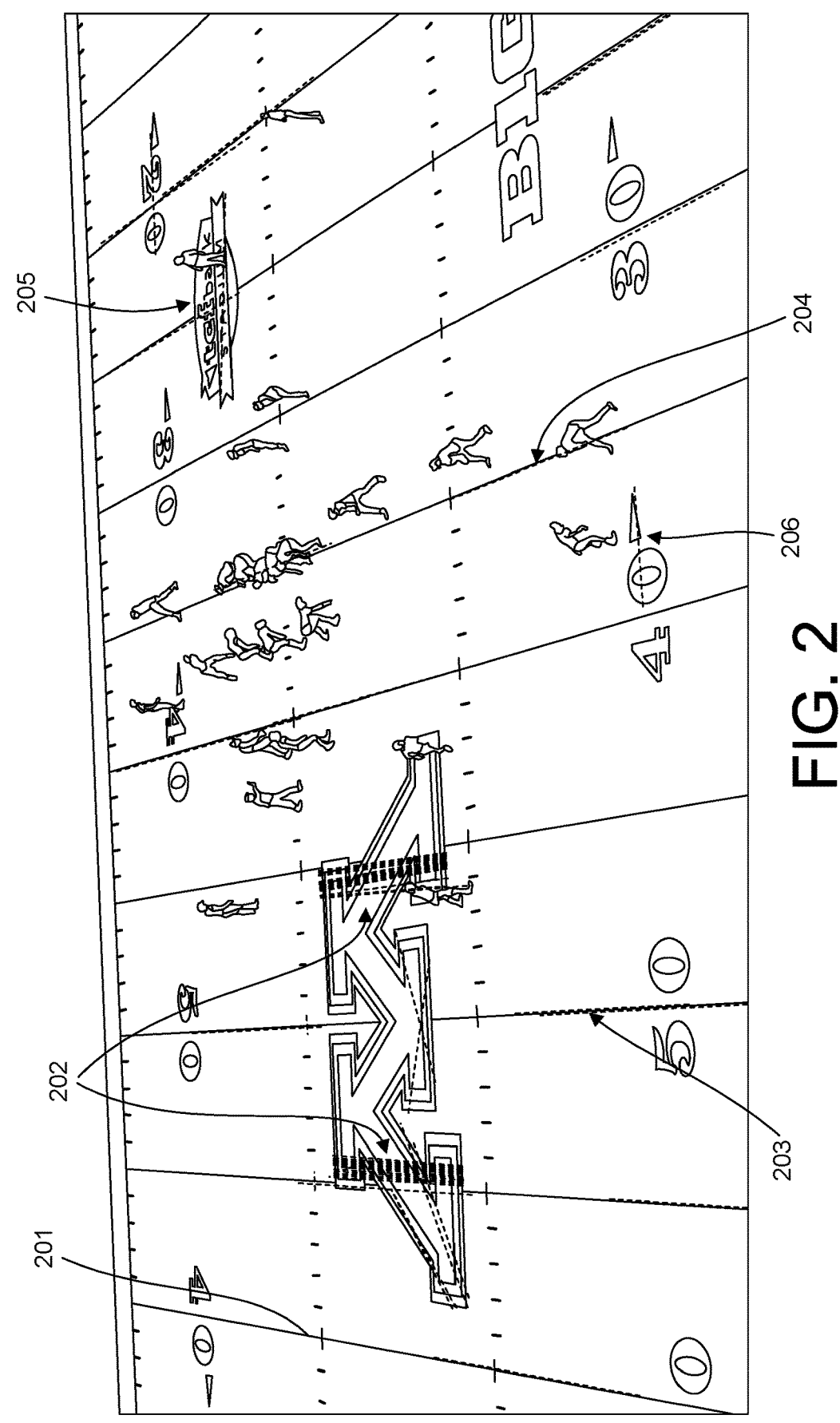
FIG. 2 is an illustration of the method and system of this invention using the Hough Lines algorithm to generate candidate line segments for reconstructing field lines.

To construct the field model, the first step is to identify the candidate field lines within the video frame. To do so, standard image processing techniques for line detection such as Canny edge detection or a Hough Lines transform are utilized. These algorithms require different input parameters such as the expected line width, minimum number of consecutive pixels to count, maximum number of gap pixels allowed, etc. and output a set of identified line segments, which serve as a basis for candidate field lines, as depicted in FIG. 2. These line segments 202, 203, 204, 205, 206 are not grouped in any sensible manner, they can be constructed from any orientation, and undesirably they often outline other markings on the field such as logos which are not relevant to the field of play. It is noted that not all line segments are provided with a reference numeral in FIG. 2.

Given the set of candidate line segments 202, 203, 204, 205, 206 the next step is to perform a series of filters to reject any obvious line segments that do not belong to an expected field line. For example, if the camera is stationed from the sideline perspective as in FIG. 2 the solid field lines 201 are expected to traverse the video frame in a vertical orientation from the bottom of the frame towards the top of the frame (aka a North/South orientation). Consequently, any line segments 205, 206 with angles that traverse East/West orientation be rejected immediately.

Figure 3:
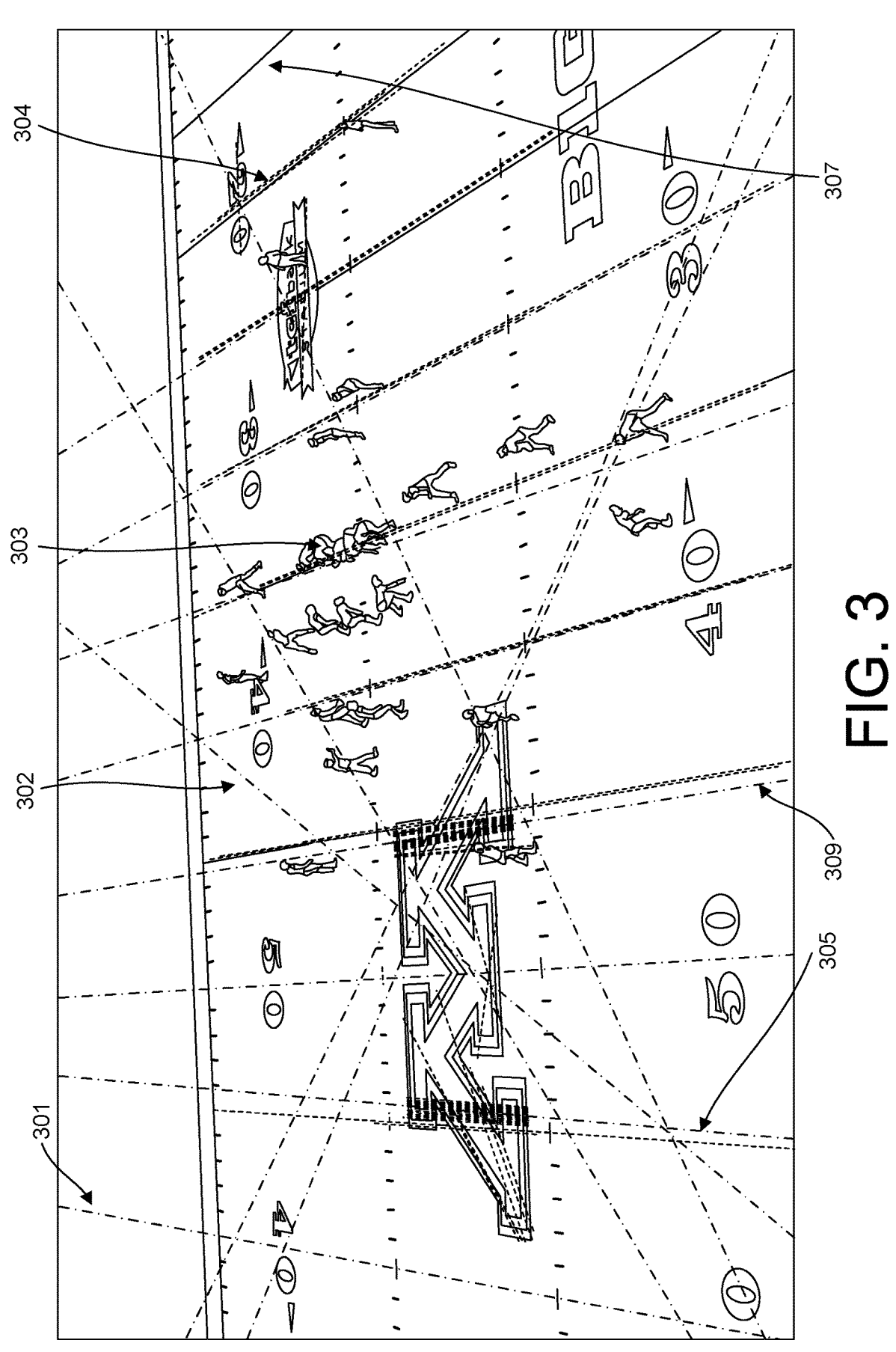
FIG. 3 is an illustration of the method and system of this invention showing candidate field lines constructed from the line segments identified by the Hough Lines algorithm.

With the obvious outline line segments now filtered, the next step is to apply a clustering algorithm to group similar line segments together into a candidate field line. As depicted in FIG. 3, the video frame is given a simple x-y Cartesian coordinate system with the upper left corner acting as the origin (0,0) and then each line segment 301, 302, 303, 305 is extended to the edges of the video frame. Using the defined cartesian coordinate system, basic geometry is used to calculate the axis intercept for each line segment 301, 302, 303, 305. The axis intercept for the candidate field line depends on the camera perspective: the x-intercept used for vertically oriented lines 301 and the y-intercept used for horizontally oriented lines. Once the axis intercept is computed for each line segment, the line segments with axis intercepts within a defined threshold value are then combined into a "cluster" of line segments. As FIG. 2 and FIG. 3 demonstrate, there are typically N line segments identified in the video frame (shown in FIG. 2) which are then grouped into a smaller number K clusters of candidate field lines (shown in FIG. 3). Typically, K«N with N commonly being over one-hundred line segments 202, 203, 204, 205, 206 which are then grouped into less than two dozen K clusters.

The next phase of the algorithm is to then iterate through each of the K clusters and for each cluster use the individual line segments 202, 203, 204, 205, 206 within that cluster to construct a single candidate field line 301, 302, 303, 305.

This line construction is done using standard geometry techniques such as using a polynomial fitting algorithm. At the conclusion of this step, the system produces a set of K candidate field lines 301, 302, 303, 305 for the given video frame.

The set of candidate field lines produced at this point, however, is often not accurate. The constructed field lines identified 301, 302, 303, 305 often doesn't match the actual field lines that can be observed in the video frame by a human expert. Deficiencies in the line detection algorithm, mis-calibrated input parameters, occlusion in the field lines from players, and varying video quality are common reasons for detecting fewer than expected field lines such as the missing candidate field line at 307. Moreover, extraneous field markings (i.e., logos such as 202) and other irrelevant markings 205 will often produce false positive candidate field lines or skew the alignment of valid field lines. For example, candidate field lines 305 and 309 are not aligned with the underlying field line as illustrated in FIG. 3.

The present invention advances the art by using the other standard field markings, namely hashmark and field numbers, to resolve these issues.

Figure 4:
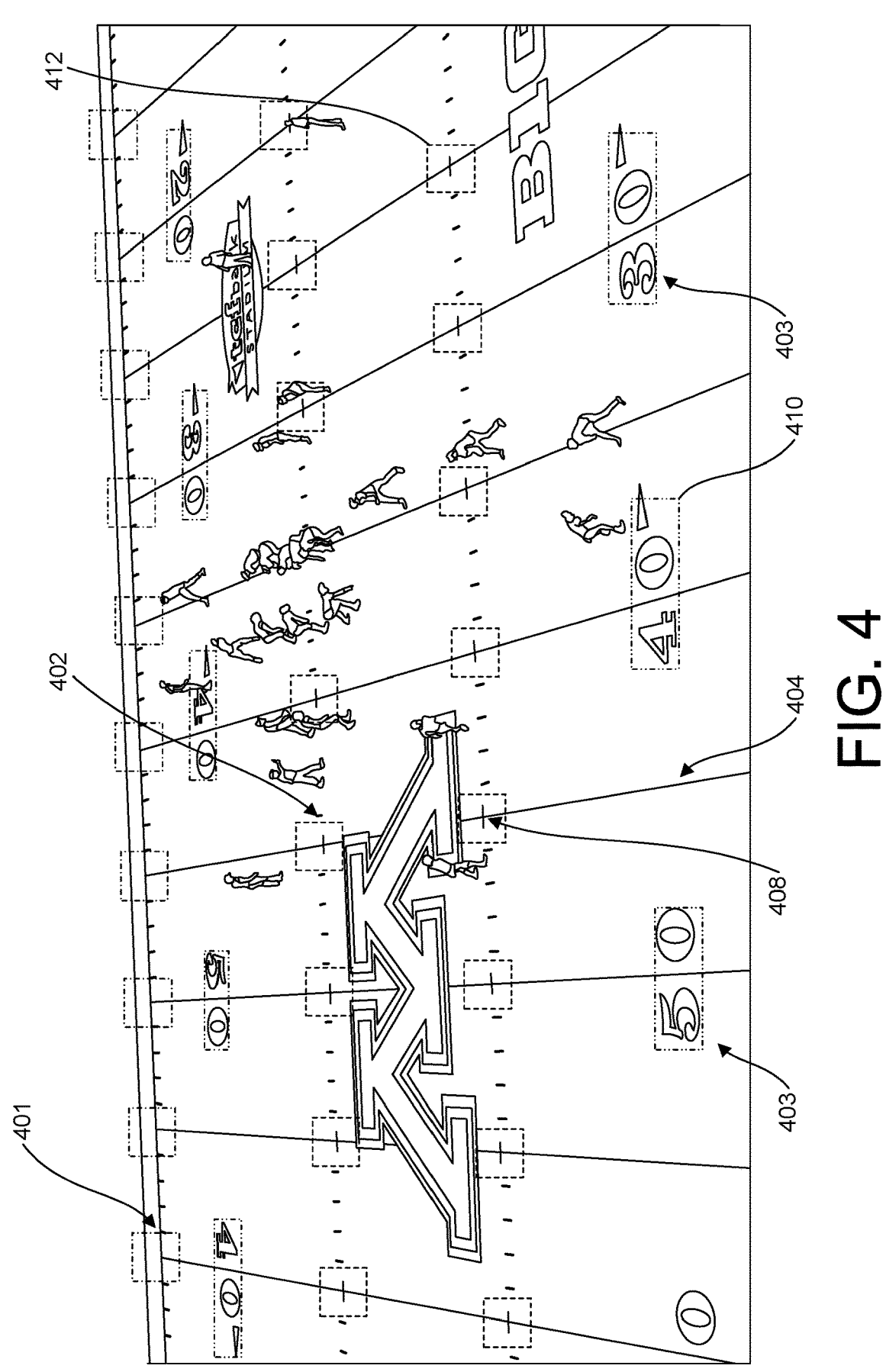
FIG. 4 is an illustration of the method and system of this invention showing how the standard field markings are annotated for deep learning to train a neural network for object detection.

To utilize these field markings, the system must first be able to detect these objects in real-time within the video. To enable this capability, the system employs deep learning to train a neural network model which can detect the hashmarks and field numbers on the field of play. As depicted in FIG. 4, thousands of images of football fields from different camera angles, lighting conditions, perspectives, etc. were obtained and the hashmark 401, 402 and field number markings 403 locations within the images were annotated by human experts. These annotations were then used to train a neural network and produce a generalized model which is then able to identify these same types of field objects 401, 402, 403 in otherwise unseen video footage processed by the system. In some aspects, the annotations may include a field number bounding box 410 and a hashmark bounding box 412.

Figure 5:
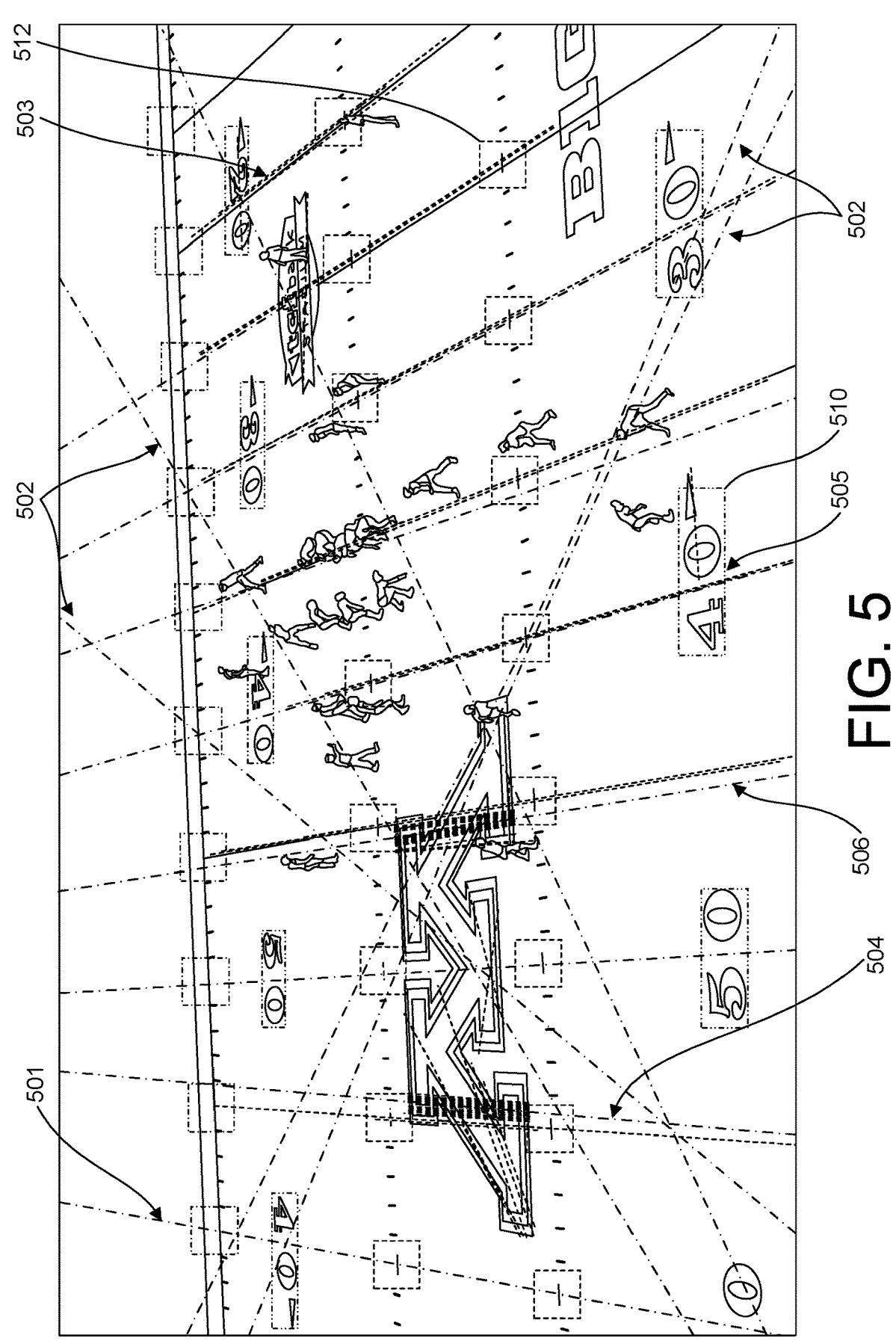
FIG. 5 is an illustration of the method and system of this invention showing how the locations of identified hashmark objects and field number objects are used to assign confidence scores to candidate field lines.

With the ability to detect these known field objects 401, 402, 403 within a video frame, the geometrical relationships of the field objects to the field lines are then utilized to assign confidences to each of the candidate field lines. For example, as shown in FIG. 4 in a standard American football field (regardless of the level of competition), solid field lines 404 painted on the field of play intercept the hashmarks in the middle of the field 402 with a very discernible crossing line segment 408 drawn on the field at the point of interception. The field line 404 is exactly orthogonal to this crossing line segment 408 and forms a 90-degree angle when looking down at the field of play from the perspective of a bird (see FIG. 1). Furthermore, it is also true that each of the solid field lines 404 always intercept four hashmark 401, 402 locations with two in the middle of the field 402 and one on each of the two sidelines 401. Therefore, as depicted in FIG. 5 the system overlays the constructed candidate field lines 501, 502, 504, 505, 506 on the video frame along with bounding boxes 510, 512 of the hashmark 401, 402 and field number 403 objects identified by the neural network model. It is understood that FIG. 5 includes additional candidate field lines that do not include a reference numeral. The system then uses defined geometric relationships between the hashmark 401, 402 and field number 403 objects to expected field line locations to then assign a confidence for each of the K candidate field lines 501, 502, 504, 505, 506.

Suppose the system has identified H hashmark objects 401, 402 using its neural network model. For each of the K candidate field lines 501, 502, 504, 505, 506 each field line is then checked to see how many of the H hashmark objects 401, 402 it intercepts and for each interception the confidence is increased by some preassigned value. Recall that a fully visible field line 404 will intercept up to four hashmark objects 401, 402 with two in the middle of the field 402 and one on each sideline 401. Commonly, due to the zoom level of the camera and occlusion of players or referees a valid field line 404 will intercept two hashmark 402 objects and one sideline 401 object.

Next, the system uses the identification of field numbers 403 in a similar fashion to adjust the confidence for a candidate field line 501, 502, 504, 505, 506. For example, in a standard American football field (regardless of the level of competition), every other field line 404 intercepts a field number marking 403 on the field of play. Specifically, these field lines bisect the field numbers 403.

Suppose the system has identified F field number objects 403 using its neural network model. For each of the K candidate field lines 501, 502, 504, 505, 506 each field line is then checked to see how many of the F field number objects 403 it intercepts and for each interception the confidence is increased by some preassigned value. Recall that a fully visible field line 404 will intercept with either zero or two field number objects 403 (one field number on each side of the field). More commonly, due to the zoom level of the camera and occlusion of players or referees a field line 404 will typically intercept zero or one field number objects 403.

After this confidence scoring is completed, the candidate field lines 501, 502, 504, 505, 506 are then compared to a threshold value and any field lines with low confidence such as 502 are filtered. Only constructed field lines 501, 504, 505, 506 with high confidence scores are retained. Moreover, the system uses the knowledge that field lines 404 should intercept the middle of an identified hashmark 401, 402 or field number 403 object to also recalibrate the alignment of the constructed field line. This adjustment allows for skew introduced in a candidate field line 504, 506 by unwanted line segments 202 identified by the Hough Lines transform that were clustered within the constructed field line to then be corrected so the constructed field line more perfectly overlays the field line 404 painted on the field of play. 501 is a good example of how a constructed field line is desired to perfectly align with the field line 404 painted on the field of play.

Figure 6:
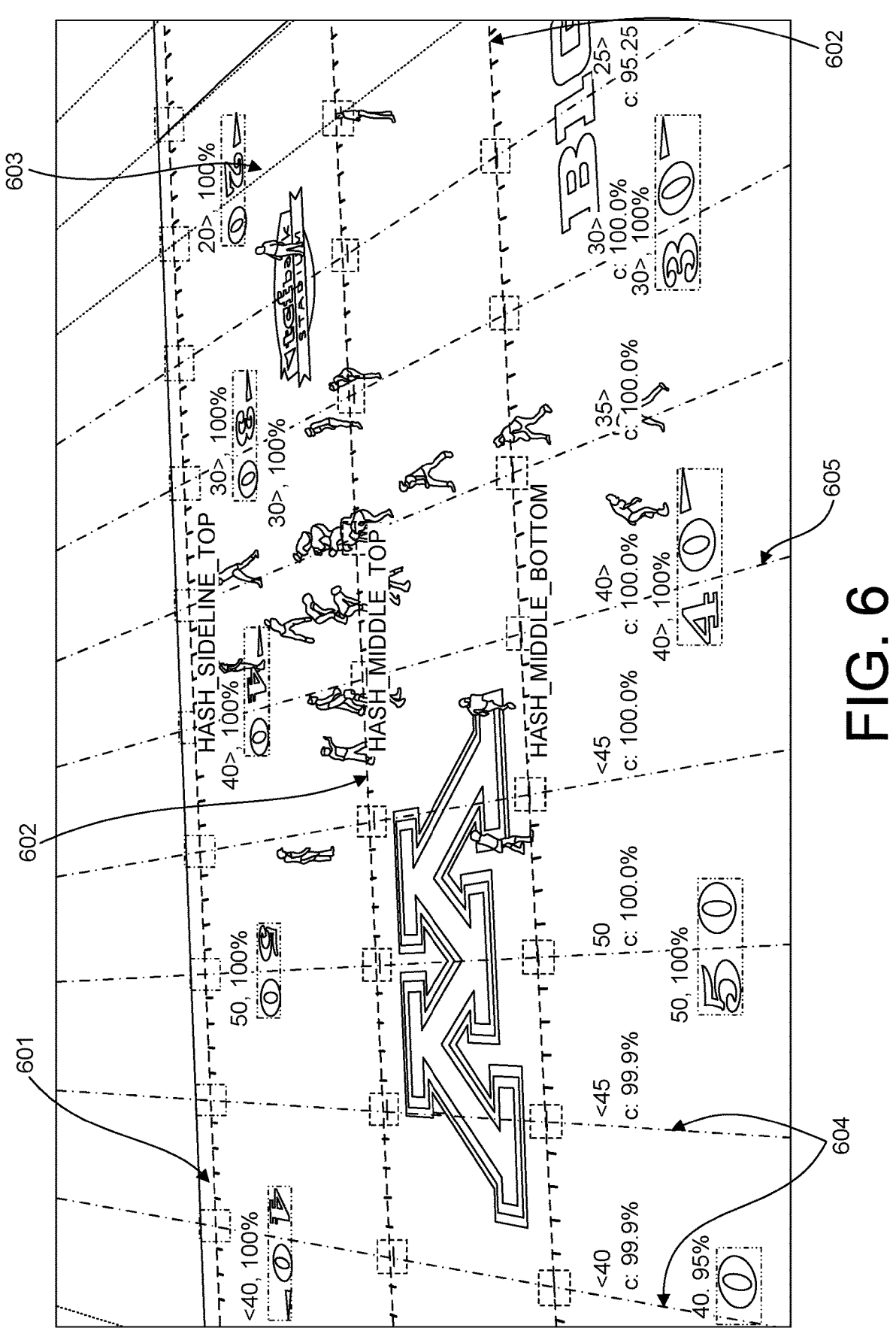
FIG. 6 is an illustration of the method and system of this invention showing how the identified hashmark objects are used to construct the hashmark lines and sidelines as well as how the labels of the identified field number objects are used to assign location names to the candidate field lines.

At this point, as shown in FIG. 6 the system now has a final set of K candidate field lines 604, 605 with assigned confidences based upon the number of hashmark 401, 402 and field number objects 403 intercepted. Moreover, the high confidence field lines 501, 504, 505, 506 have been recalibrated to perfectly intercept the expected locations within the hashmark 401, 402 and field number 403 objects identified by the neural network model. The final candidate field lines 604, 605 now perfectly align with the actual field lines 404 painted on the field of play. Lastly, the system then also uses the geometrical relationships of the hashmark objects 401, 402 to then construct hashmark lines 602 for the two hashmarks in the middle of the field as well as any visible sidelines 601 on the field of play. The hashmark lines 602 and sidelines 601 are arranged orthogonal to the candidate field lines 604, 605 and are parallel to the length of the field.

The field numbers 403 provide another novel opportunity: the system can use the values of these field numbers 403 to now assign each of the candidate field lines 604, 605 a value for where this location is on the field of play. For example, if a candidate field line 605 has a high confidence score because it intercepts three hashmark 401, 402 objects as well as intercepting the 40> field number object 505 identified by the neural network model then we can have confidence this field line 605 is in fact the 40> yard field line on the field. In some aspects, location names may be assigned to the candidate field lines based upon intercepting identified field numbers and the geometrical definitions of the field of play.

Figure 7:
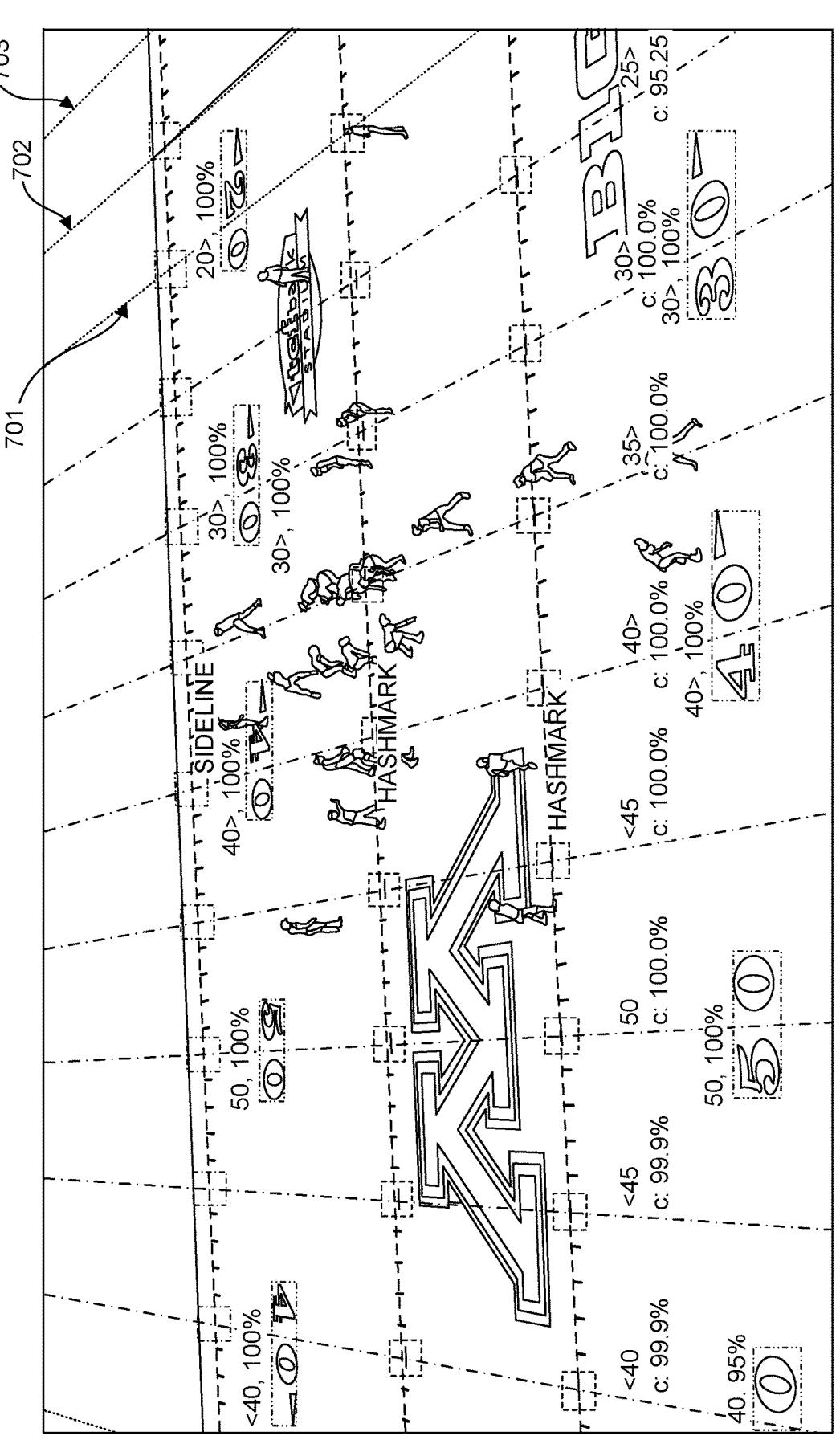
FIG. 7 is an illustration of the method and system of this invention showing how the high confident field lines are used to interpolate and add any missing field lines.

The present invention advances the art even further. Using the predefined dimensions of an American football field (field lines 404 are spaced very five yards apart, every other field line intercepts a field number 403, all field lines are parallel, a field is one hundred twenty yards long, etc.) the system then performs another post processing pass on the video frame to identify any expected, but missing, field lines. As depicted in FIG. 7, the system uses the geometrical relationships relative to the high confidence constructed field lines 604, 605 and other field markings 401, 402, 403 identified by the neural network model to interpolate and add the missing field lines 701, 702, 703. The assigned confidences for these projected field lines 701, 702, 703 are lower than the other constructed field lines but the conditional probabilities are still very good because they were inferred from otherwise high-quality detected field objects 401, 402, 403. The system then performs a final confidence scoring on these projected field lines 701, 702, 703 and any field lines with low confidence such as 703 are filtered. Only constructed field lines 604, 605, 701, 702 with high confidence scores are retained.

Figure 8:
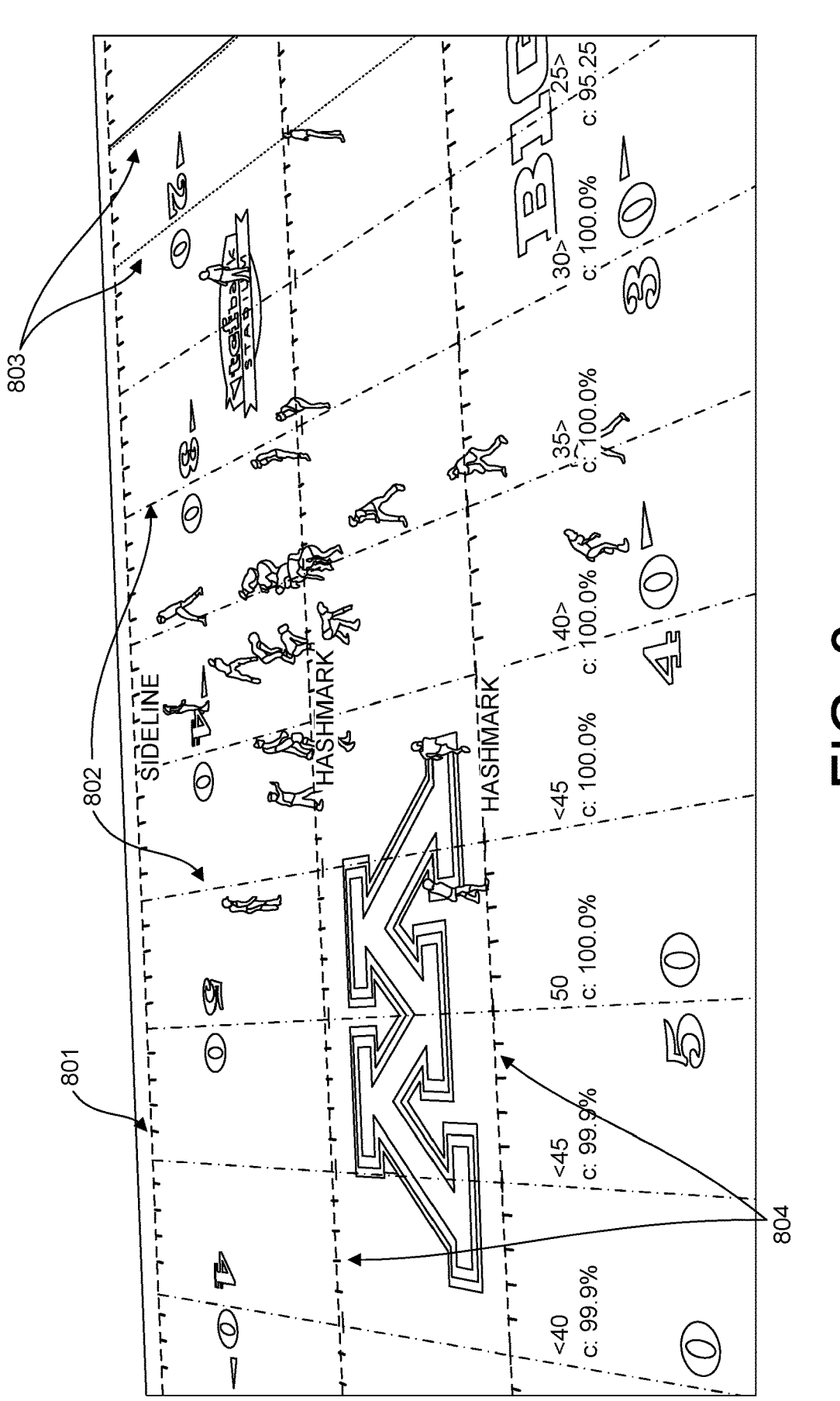
FIG. 8 is an illustration of the method and system of this invention showing the final set of high confidence constructed field lines, hashmark lines, and sidelines.

At this point, as depicted in FIG. 8 the system has reconstructed a very high confidence field model for the sidelines 801, hashmarks 804, and field lines 802, 803. Moreover, this system has produced a model that independent of human error, subjectivity, and it accounts for the wide variations in the video quality. The system can overlay this high-quality field model on to the original video for automating annotations, to assist with other video analytic processes, as an aid to human experts that are manually annotating the video.

FIG. 9 illustrates a system 900 configured for reconstructing field lines within video, in accordance with one or more implementations. In some implementations, system 900 may include one or more computing platforms 902. Computing platform(s) 902 may be configured to communicate with one or more remote platforms 904 according to a client/server architecture, a peer-to-peer architecture, and/or other architectures. Remote platform(s) 904 may be configured to communicate with other remote platforms via computing platform(s) 902 and/or according to a client/server architecture, a peer-to-peer architecture, and/or other architectures. Users may access system 900 via remote platform(s) 904.

Computing platform(s) 902 may be configured by machine-readable instructions 906. Machine-readable instructions 906 may include one or more instruction modules. The instruction modules may include computer program modules. The instruction modules may include one or more of set obtaining module 908, model training module 910, model storing module 912, candidate field line identifying module 914, field object detecting module 916, confidence assigning module 918, comparing module 920, reconciling module 922, information overlaying module 924, and/or other instruction modules.

Set obtaining module 908 may be configured to obtain sets of football video information. Individual ones of the sets of football video information may reflect gameplay. The football video information may include one or more frames of a football game or practice including still images, moving images, video, and may include digital or analog video. In some aspects, the football video information may be transformed in some manner prior to being obtained. Gameplay may include at least a portion of a football game or practice and may include images of players, field markings, lines, plays, objects, gear, formations, and other items necessary for playing football. The video may include one or more frames from various angles, positions, locations, lighting, video speeds, games, or teams.

Model training module 910 may be configured to train a machine-learning model, also known as a neural network or artificial intelligence model, with the obtained sets of football video information such that the machine-learning model predicts the locations of one or more hashmark and field number. The machine-learning model may be used to identify field objects, for example hashmarks and field numbers, on previously unviewed or unseen video footage. In some aspects, training a machine-learning model may include manually annotating sample video footage.

Model storing module 912 may be configured to store the trained machine-learning model. The model may be stored in any location and in any type of storage media. The model may be encrypted prior to storage, during storage, and/or upon retrieval from storage. In some aspects, the model may be stored remotely, in other aspects, the model may be stored locally.

Candidate field line identifying module 914 may be configured to identify a plurality of candidate field lines in one or more frame of input video. The input video may be any unseen or unannotated video reflecting at least one frame of football gameplay. The candidate field line identifying module 914 may utilize classic line detection algorithms to detect a set of candidate field lines. In one aspect, the candidate field line identifying module 914 may use Canny edge detection and Hough line transforms for identifying candidate field lines. In some aspects, the candidate field line identifying module 914 may apply a clustering algorithm to group similar line segments into a cluster, and iterate through the cluster to identify a single candidate field line. This may be performed for a plurality of clusters. In some aspects, the clustering algorithm groups line segments having similar axis intercepts.

Field object detecting module 916 may be configured to identify or locate field objects in one or more frame of input video using the stored machine-learning model. In some aspects, the field object detection module 916 may identify or locate hashmarks and field numbers in at least one frame of input video.

Confidence assigning module 918 may be configured to assign a confidence value to each of the plurality of candidate field lines identified by the candidate field line identifying module 914. The confidence value of a candidate field line may increase based on its orientation to identified field objects. For example, a confidence value for a candidate field line may increase if the confidence assigning module 918 determines that the candidate field line intercepts one or more hashmark. Additionally, a confidence value for a candidate field line may increase if the confidence assigning module 918 determines that the candidate field line intercepts a field number. Conversely, if a candidate field line fails to intercept or have a determined relationship with a hashmark or field number, the confidence value associated with the candidate field line may be reduced.

Comparing module 920 may be configured to compare a confidence value of each of a plurality of candidate field lines. In one aspect, the comparing module 920 may compare each confidence value to a threshold. The comparing module 920 may remove one or more low confidence candidate field line from the plurality of candidate field lines. Additionally, the comparing module may retain one or more high confidence candidate field line from the plurality of candidate field lines.

Reconciling module 922 may be configured to reconcile or recalibrate the alignment of the one or more high confidence candidate field line to intercept the middle of a detected one or more field object. For example, the reconciling module 922 may adjust the position of a high confidence candidate field line to intercept the middle of a hashmark or field number. In some aspects, the reconciling module 922 may be able to identify and replace any missing field lines that do not have a corresponding high confidence candidate field line associated therewith.

Information overlaying module 924 may be configured to overlay elements onto one or more frame of input video. The elements may include one or more candidate field line, high confidence field line, field object, field marking, hashmark line, sideline, and annotation box. In some aspects, the annotation box may include a bounding box surrounding a detected field object. The elements may form at least a portion of a field model that may be overlayed or otherwise displayed simultaneously with at least one frame of input video. In some aspects, the overlaying module may create a field model including the one or more high confidence candidate field line, one or more hashmark or hashmark line, and one or more sideline.

In some implementations, computing platform(s) 902, remote platform(s) 904, and/or external resources 926 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 902, remote platform(s) 904, and/or external resources 926 may be operatively linked via some other communication media.

A given remote platform 904 may include one or more processors configured to execute computer program modules. The computer program modules may be configured to enable an expert or user associated with the given remote platform 904 to interface with system 900 and/or external resources 926, and/or provide other functionality attributed herein to remote platform(s) 904. By way of non-limiting example, a given remote platform 904 and/or a given computing platform 902 may include one or more of a server, a desktop computer, a laptop computer, a handheld computer, a tablet computing platform, a Netbook, a Smartphone, a gaming console, supercomputer, quantum computer, and/or other computing platforms.

External resources 926 may include sources of information outside of system 900, external entities participating with system 900, and/or other resources. In some implementations, some or all of the functionality attributed herein to external resources 926 may be provided by resources included in system 900.

Computing platform(s) 902 may include electronic storage 928, one or more processors 930, and/or other components. Computing platform(s) 902 may include communication lines, or ports to enable the exchange of information with a network and/or other computing platforms. Illustration of computing platform(s) 902 in FIG. 9 is not intended to be limiting. Computing platform(s) 902 may include a plurality of hardware, software, and/or firmware components operating together to provide the functionality attributed herein to computing platform(s) 902. For example, computing platform(s) 902 may be implemented by a cloud of computing platforms operating together as computing platform(s) 902.

Electronic storage 928 may comprise non-transitory storage media that electronically stores information. The electronic storage media of electronic storage 928 may include one or both of system storage that is provided integrally (i.e., substantially non-removable) with computing platform(s) 902 and/or removable storage that is removably connectable to computing platform(s) 902 via, for example, a port (e.g., a USB port, a firewire port, etc.) or a drive (e.g., a disk drive, etc.). Electronic storage 928 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 928 may include one or more virtual storage resources (e.g., cloud storage, a virtual private network, and/or other virtual storage resources). Electronic storage 928 may store software algorithms, information determined by processor(s) 930, information received from computing platform(s) 902, information received from remote platform(s) 904, and/or other information that enables computing platform(s) 902 to function as described herein.

Processor(s) 930 may be configured to provide information processing capabilities in computing platform(s) 902. As such, processor(s) 930 may include one or more of a digital processor, an analog processor, a digital circuit designed to process information, an analog circuit designed to process information, a state machine, and/or other mechanisms for electronically processing information. Although processor(s) 930 is shown in FIG. 9 as a single entity, this is for illustrative purposes only. In some implementations, processor(s) 930 may include a plurality of processing units. These processing units may be physically located within the same device, or processor(s) 930 may represent processing functionality of a plurality of devices operating in coordination. Processor(s) 930 may be configured to execute modules 908, 110, 912, 914, 916, 918, 920, 922, and/or 924, and/or other modules. Processor(s) 930 may be configured to execute modules 908, 110, 912, 914, 916, 918, 920, 922, and/or 924, and/or other modules by software; hardware; firmware; some combination of software, hardware, and/or firmware; and/or other mechanisms for configuring processing capabilities on processor(s) 930. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 908, 110, 912, 914, 916, 918, 920, 922, and/or 924 are illustrated in FIG. 9 as being implemented within a single processing unit, in implementations in which processor(s) 930 includes multiple processing units, one or more of modules 908, 110, 912, 914, 916, 918, 920, 922, and/or 924 may be implemented remotely from the other modules. The description of the functionality provided by the different modules 908, 110, 912, 914, 916, 918, 920, 922, and/or 924 described below is for illustrative purposes, and is not intended to be limiting, as any of modules 908, 110, 912, 914, 916, 918, 920, 922, and/or 924 may provide more or less functionality than is described. For example, one or more of modules 908, 110, 912, 914, 916, 918, 920, 922, and/or 924 may be eliminated, and some or all of its functionality may be provided by other ones of modules 908, 110, 912, 914, 916, 918, 920, 922, and/or 924. As another example, processor(s) 930 may be configured to execute one or more additional modules that may perform some or all of the functionality attributed below to one of modules 908, 110, 912, 914, 916, 918, 920, 922, and/or 924.

Figure 10A:
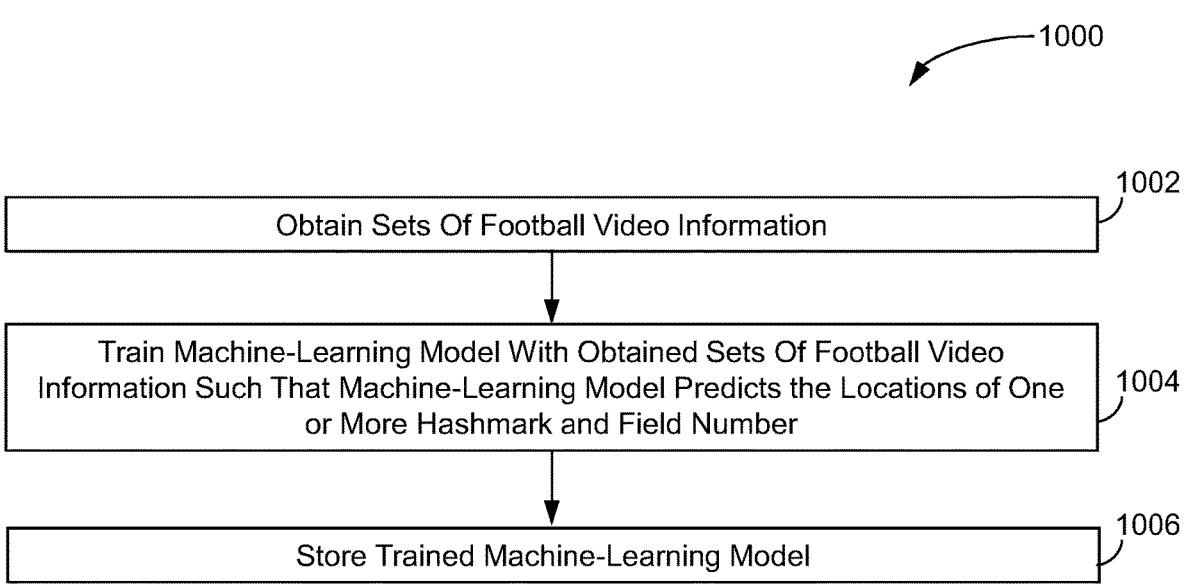
FIGS. 10A and 10B illustrate a method for reconstructing field lines within video, in accordance with one or more implementations.
Figure 10B:
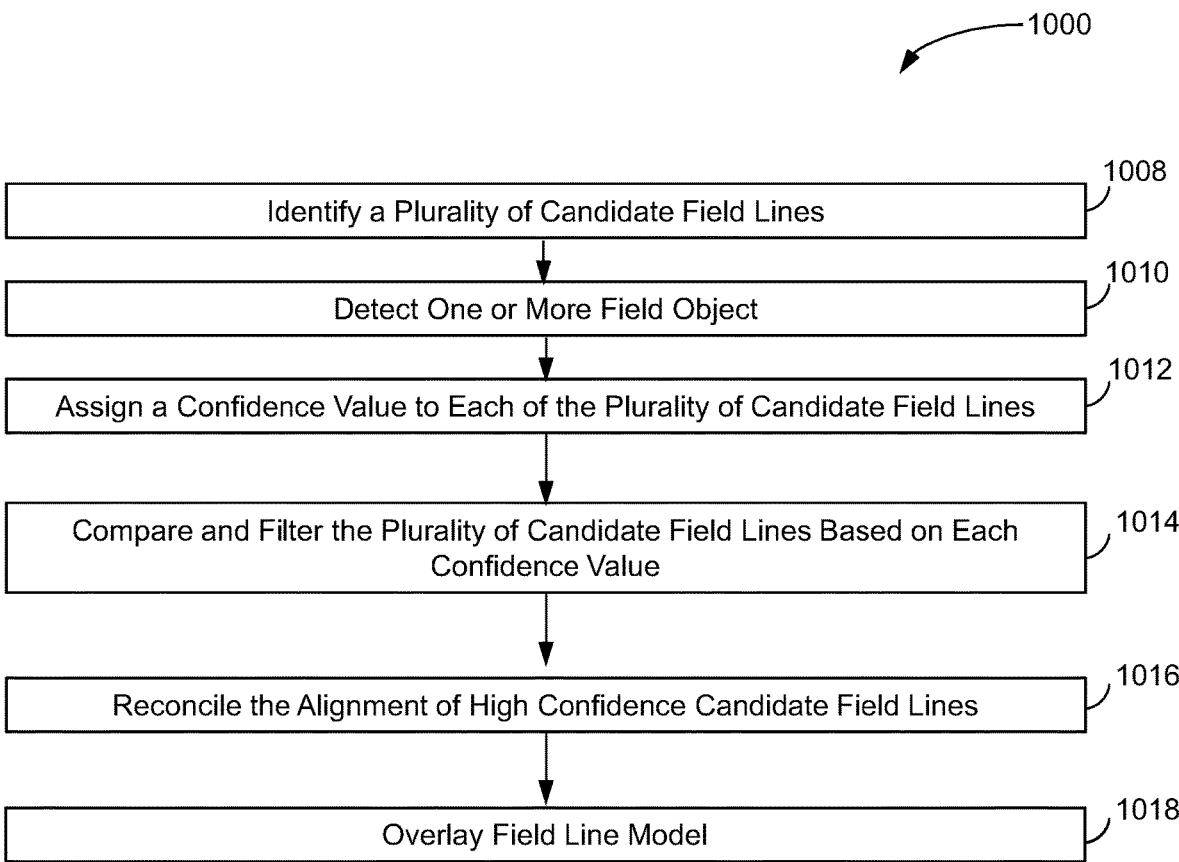

FIGS. 10A and 10B illustrate a method 1000 for reconstructing field lines within video, in accordance with one or more implementations. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIGS. 10A and 10B, and described below is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

FIG. 10A illustrates method 1000, in accordance with one or more implementations.

An operation 1002 may include obtaining sets of football video information. The sets of football video information may reflect gameplay. Operation 1002 may be performed by one or more hardware processors configured by machine-readable instructions including a module that is the same as or similar to set obtaining module 908, in accordance with one or more implementations.

An operation 1004 may include training a machine-learning model with the obtained sets of football video information such that the machine-learning model predicts the locations of one or more field object, for example one or more hashmark and field number in previously unseen or unannotated video. In some aspects, training a machine-learning model may include annotating sample video. Operation 1004 may be performed by one or more hardware processors configured by machine-readable instructions including a module that is the same as or similar to model training module 910, in accordance with one or more implementations.

An operation 1006 may include storing the trained machine-learning model. Operation 1006 may be performed by one or more hardware processors configured by machine-readable instructions including a module that is the same as or similar to model storing module 912, in accordance with one or more implementations.

FIG. 10B illustrates method 1000, in accordance with one or more implementations. An operation 1008 may include identifying a plurality of candidate field lines from at least one frame of input video. Input video may include video that has been unviewed by the system and/or includes no annotations. Operation 1008 may be performed by one or more hardware processors configured by machine-readable instructions including a module that is the same as or similar to candidate field line identifying module 914, in accordance with one or more implementations.

An operation 1010 may include detecting, using the machine-learning model, one or more field object in the input video. In some aspects, the one or more field object may include one or more hashmark or field number. Operation 1010 may be performed by one or more hardware processors configured by machine-readable instructions including a module that is the same as or similar to field object detecting module 916, in accordance with one or more implementations.

An operation 1012 may include assigning a confidence value to each of a plurality of candidate field lines. In some implementations, a hashmark intercept or a field number intercept may increase the confidence value. Operation 1012 may be performed by one or more hardware processors configured by machine-readable instructions including a module that is the same as or similar to confidence assigning module 918, in accordance with one or more implementations.

An operation 1014 may include comparing and filtering the plurality of candidate field lines based on each assigned confidence value. Operation 1014 may be performed by one or more hardware processors configured by machine-readable instructions including a module that is the same as or similar to comparing module 920, in accordance with one or more implementations.

An operation 1016 may include reconciling or recalibrating the alignment of the one or more high confidence candidate field line to intercept the middle of a detected one or more field object, for example one or more hashmark or field number. Operation 1016 may be performed by one or more hardware processors configured by machine-readable instructions including a module that is the same as or similar to reconciling module, in accordance with one or more implementations.

An operation 1018 may include overlaying one or more portion of created field line model onto one or more frames of the input video. The field line model may include one or more candidate field line, high confidence field line, field object, field marking, hashmark or hashmark line, sideline, and annotation box. Operation 1018 may be performed by one or more hardware processors configured by machine-readable instructions including a module that is the same as or similar to information overlaying module, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

The invention claimed is:

1. A system for reconstructing field lines within video, comprising:

one or more processors configured by machine-readable instructions for:

identifying a plurality of candidate field lines in one or more frames of video;

training a neural network to detect one or more field objects;

detecting, using the neural network, one or more field objects in the one or more frames of video;

assigning, using the detected one or more field objects, a confidence value to each of the plurality of candidate field lines;

removing one or more low confidence candidate field lines from the plurality of candidate field lines; and retaining one or more high confidence candidate field lines from the plurality of candidate field lines.

2. The system of claim 1, wherein identifying a plurality of candidate field lines comprises:

applying a clustering algorithm to group similar line segments into a cluster; and iterating through the cluster to identify a single candidate field line.

3. The system of claim 1, wherein the one or more field objects include one or more hashmarks and field numbers.

4. The system of claim 1, wherein the one or more processors are further configured by machine-readable instructions for:

recalibrating the alignment of the one or more high confidence candidate field lines to intercept the middle of at least one detected field object.

5. The system of claim 1, wherein the one or more processors are further configured by machine-readable instructions for:

constructing one or more orthogonal hashmark and sidelines.

6. The system of claim 1, wherein the one or more processors are further configured by machine-readable instructions for:

assigning the one or more high confidence candidate field lines a value of an intercepted field number.

7. The system of claim 1, wherein the one or more processors are further configured by machine-readable instructions for:

identifying and replacing one or more missing field lines.

8. The system of claim 1, wherein the one or more processors are further configured by machine-readable instructions for:

overlaying the one or more high confidence candidate field lines on the one or more frames of video.

9. The system of claim 1, wherein the identifying a plurality of candidate field lines utilizes a Canny edge or Hough line algorithm.

10. The system of claim 1, wherein the one or more processors are further configured by machine-readable instructions for:

creating a field model including the one or more high confidence candidate field lines, one or more hashmarks, one or more field numbers, and one or more sidelines.

11. The system of claim 2, wherein the clustering algorithm groups line segments having similar axis intercepts.

12. The system of claim 1, wherein training a neural network includes annotating field markings or field objects on samples of video.

13. The system of claim 1, wherein the one or more processors are further configured by machine-readable instructions for:

overlaying the one or more high confidence candidate field lines along with bounding boxes surrounding the detected one or more field objects.

14. The system of claim 1, wherein assigning a confidence value includes determining whether each of the plurality of candidate field lines intercepts one or more hashmarks.

15. The system of claim 1, wherein assigning a confidence value includes determining whether each of the plurality of candidate field lines intercepts a field number.

* * * * *